(12) United States Patent
Metcalfe et al.

(10) Patent No.: US 7,724,955 B2
(45) Date of Patent: May 25, 2010

(54) APPARATUS AND METHOD FOR AUTO WINDOWING USING MULTIPLE WHITE THRESHOLDS

(75) Inventors: David Jon Metcalfe, Marion, NY (US); Jeng-Nan Shiau, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1007 days.

(21) Appl. No.: 11/139,541

(22) Filed: May 31, 2005

(65) Prior Publication Data

US 2006/0269131 A1 Nov. 30, 2006

(51) Int. Cl.
*G06K 9/34* (2006.01)

(52) U.S. Cl. .................. 382/176; 382/199; 382/224; 358/464; 358/465; 358/466

(58) Field of Classification Search ......... 382/173–180, 382/195, 205, 237, 199, 272, 224; 358/462–466, 358/455–456, 448
See application file for complete search history.

(56) References Cited

U.S. PATENT DOCUMENTS

| | | | |
|---|---|---|---|
| 5,513,282 A | 4/1996 | Williams | |
| 5,850,474 A * | 12/1998 | Fan et al. | 382/173 |
| 6,044,179 A * | 3/2000 | Savakis | 382/270 |
| 6,198,845 B1 * | 3/2001 | Tse et al. | 382/169 |
| 6,240,205 B1 | 5/2001 | Fan et al. | |
| 6,351,566 B1 * | 2/2002 | Zlotnick | 382/237 |
| 2003/0002087 A1 | 1/2003 | Metcalfe et al. | |
| 2003/0133612 A1 * | 7/2003 | Fan | 382/199 |

OTHER PUBLICATIONS

U.S. Appl. No. 11/139,781, filed May 31, 2005, Schweid et al.
U.S. Appl. No. 11/139,546, filed May 31, 2005, Metcalfe et al.

* cited by examiner

*Primary Examiner*—Charles Kim
*Assistant Examiner*—John W Lee
(74) *Attorney, Agent, or Firm*—Oliff & Berridge, PLC

(57) ABSTRACT

Methods and apparatus for segmenting image data into windows and rendering a best-estimate outline delineating document windows may include adjusting a background white threshold differently than adjusting a white threshold normally used to classify pixels as white for video processing purposes. Such an independently arrived at threshold may be more suitable for the different task of differentiating between document background and document content.

15 Claims, 2 Drawing Sheets

APPARATUS AND METHOD FOR AUTO WINDOWING USING MULTIPLE WHITE THRESHOLDS

Cross-reference is made to co-pending, commonly assigned applications, including: U.S. patent application Ser. No. 11/139,781, filed May 31, 2005, entitled "Apparatus and Method for Sub-Typing Window Elements in a Document Windowing System" to Schweid et al., and U.S. patent application Ser. No. 11/139,546, filed May 31, 2005, entitled "Apparatus and Method for Detecting and Processing White Areas Within Document Windows" to Metcalfe et al., which are incorporated herein by reference in their entirety.

BACKGROUND

The present disclosure relates to methods and apparatus for segmenting a page of image data into one or more windows and for classifying the image data within each window as a particular type of image data. Specifically, the present disclosure relates to apparatus and methods for differentiating background from document content.

Image data is often stored in the form of multiple scanlines, each scanline comprising multiple pixels. When processing such image data, it is helpful to know the type of image represented by the data. For instance, the image data may represent graphics, text, a halftone, continuous tone, or some other recognized image type. A page of image data may be all one type, or some combination of image types.

It is known in the art to separate the image data of a page into windows of similar image types. For instance, a page of image data may include a halftone picture with accompanying text describing the picture. It is further known to separate the page of image data into two or more windows, a first window including the halftone image, and a second window including the text. Processing of the page of image data may then be carried out by tailoring the processing of each area of the image to the type of image data being processed as indicated by the windows.

It is also known to separate a page of image data into windows and to classify and process the image data within the windows by making either one or two passes through the page of image data. Generally, images are presented to processing equipment and processed in a raster or other fashion such that at any given time, only a certain portion of the image data has been seen by the processing equipment, the remaining portion yet to be seen.

In a one pass system the image data is run through only once, whereas in a two pass system the image data is run through twice. The second pass does not begin until some time after the first pass has completed. A one pass method is generally quicker, but does not allow the use of "future" context to correct information that has already been generated. In a two pass method, information obtained for a third or fourth scanline may be used to generate or correct information on a first or second scanline, for example. In other words, during the second pass, "future" context may be used to improve the rendering of the image data because the image data was previously processed during the first pass.

During the first pass of a two pass method, pixels may be classified, tagged according to image type, and both the image video and classification tag stored. Such tags and image video may analyzed and the results used to associate pixels into larger windows. Statistics on the image video and classification tags for these windows may be gathered for each window, as well as for the area outside of all windows. After the first pass finishes but before the second pass begins, software may read the window and non-window statistics and may use calculations and heuristic rules to classify the delineated areas of windows and non-windows. During the second pass, the results of this classification, as well as the pixel tag and image video from the first pass, may be used to control optimized processing of the image video.

Typically, windows within a document image are detected as areas separated by white areas of the document. Exemplary methods and apparatus for classifying image data are discussed in U.S. Pat. Nos. 5,850,474 and 6,240,205 to Fan et al., each of which is incorporated herein by reference in its entirety. Typically, such windowing methods depend heavily on the luminance and/or chrominance of the video to delineate the boundaries of windows.

SUMMARY

Exemplary methods and apparatus for windowing image data may be incorporated in scanning devices and may comprise separating and keeping track of pixels labeled as "background" area vs. "non-background" area. Such methods may also include classifying the image data within a window as a particular image type and recording document statistics regarding window areas, non-window areas and image type of each pixel.

To improve efficiency, window labels, or IDs, may be allocated on an ongoing basis during, for example, first-pass processing, while at the same time dynamically compiling window ID equivalence information. Once the image type for each window is known, further processing of the image data may be more optimally specified and performed.

Exemplary embodiments may automatically locate a window contained within a document. A window is defined herein as any non-background area, such as a photograph or halftone picture, but may also include text, background noise and white regions. Various embodiments described herein include two passes through the image data.

During a first pass through the imaged data, a classification module may classify pixels may as white, black, edge, edge-in-halftone, continuous tone (rough or smooth), and halftones over a range of frequencies. Concurrently, a window detection module may generate window-mask data, may collect document statistics, and may develop an ID equivalence table, all to separate the desired windows from undesired regions.

Windowing may be accomplished by identifying and keeping track of pixels labeled as "background" vs. "non-background" and by combining image-run sections of scanlines to form windows. Statistics on pixel classification may then compiled and examined.

Known first pass window operation methods may be used to accomplish these functions, including the methods described in the aforementioned Fan references, the entire disclosures of which are hereby incorporated by reference.

During a second pass through the image data, pixel tags may be modified by a retagging module, replacing each pixel's first-pass tag with a new tag indicating association with a window. These tags may be later used to control downstream processing or interpretation of the image.

Document content may detrimentally interact with video levels of adjacent background pixels through optical, electrical or algorithmic mechanisms in preceding scanning or image processing systems. Such interaction may result in background areas decreasing from their proper white level as the true transition from background white to the document object is approached. The result of such detrimental interaction is window "growing." Objects may be joined that should remain separate, or there may be artifacts around window edges stemming from inaccurate placement.

Rather than focusing on the classification of individual pixels, exemplary embodiments may render a best-estimate outline delineating document windows by using a window detect white threshold determined differently than the pixel classification white threshold used to classify a pixel as being "white." Such an independently arrived at threshold may better delineate between white background and document content.

Various system parameters may be set with default values until sufficient data has been collected to determine new values which will improve the delineation of the outline of the window.

The appropriate value for the window detection white threshold may depend upon various system parameters and video statistics which correlate to warping of video levels in the vicinity of window boundaries. Most commonly, this comprises white background levels being reduced in the vicinity of darker windows, but analogous effects may take place in documents with dark backgrounds and lighter windows. Exemplary embodiments designed to better delineate window outlines may be based upon fixed, document and/or system dependent parameters, either static during an entire page or dynamically adjusted during page processing, to automatically adjust the background white threshold parameter.

BRIEF DESCRIPTION OF THE DRAWINGS

Various exemplary embodiments are described in detail, with reference to the following figures, wherein.

DETAILED DESCRIPTION OF EMBODIMENTS

Figure 1:
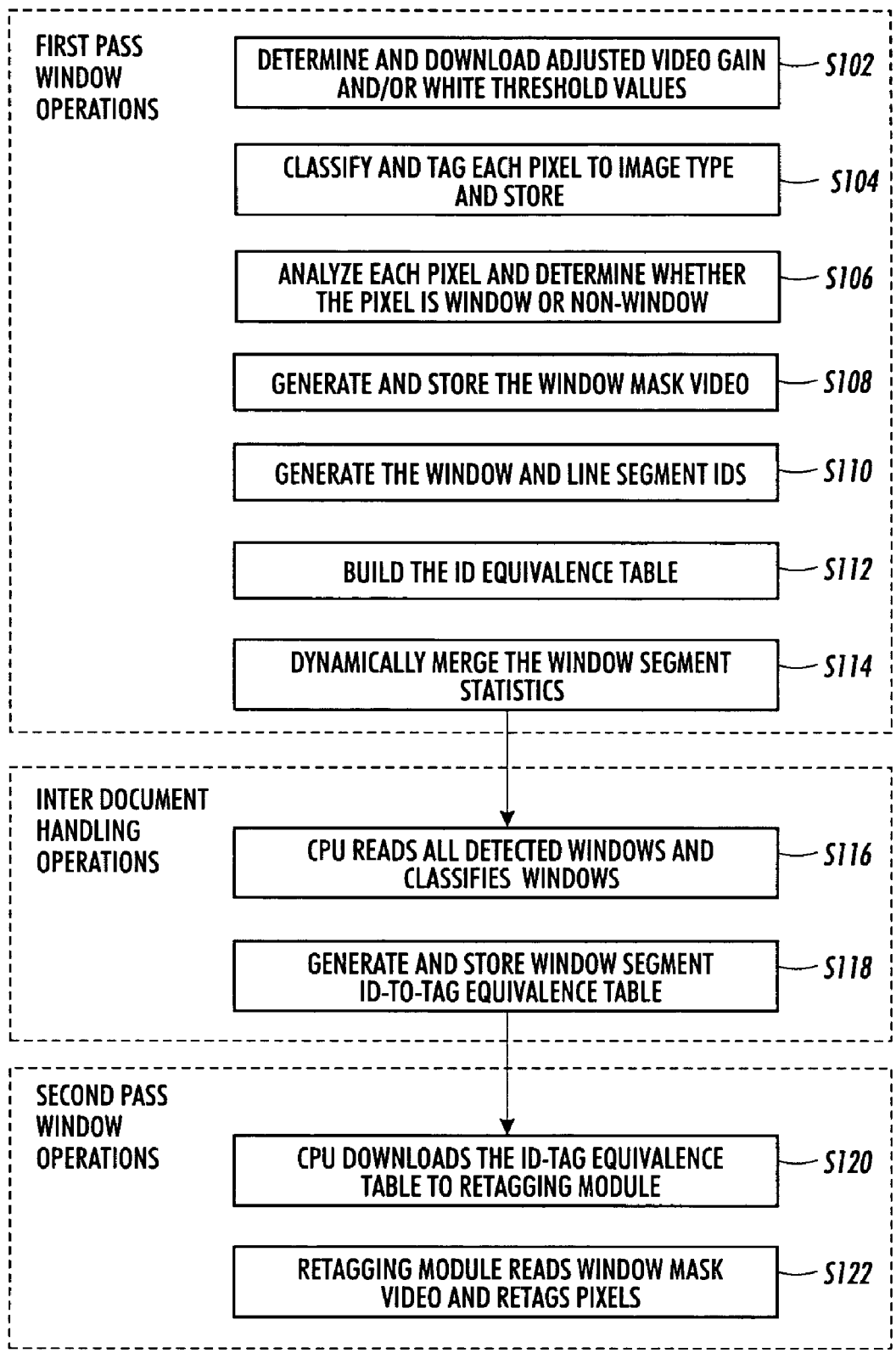
FIG. 1 shows a flowchart illustrating an exemplary two pass windowing method.

Apparatus and methods for detecting white areas within windows may be incorporated within image scanners and may include two passes through the image data. FIG. 1 is a flowchart illustrating an exemplary two pass windowing method.

The exemplary method classifies each pixel as a particular image type, separates a page of image data into windows and background, collects document statistics on window areas, non-window areas and pixel image type and retags pixels appropriately based upon the collected statistics. Once the image type for each window is known, rendering, or other processing modules, not shown, may process the image data and do so more optimally than if the windowing and retagging were not performed.

Figure 2:
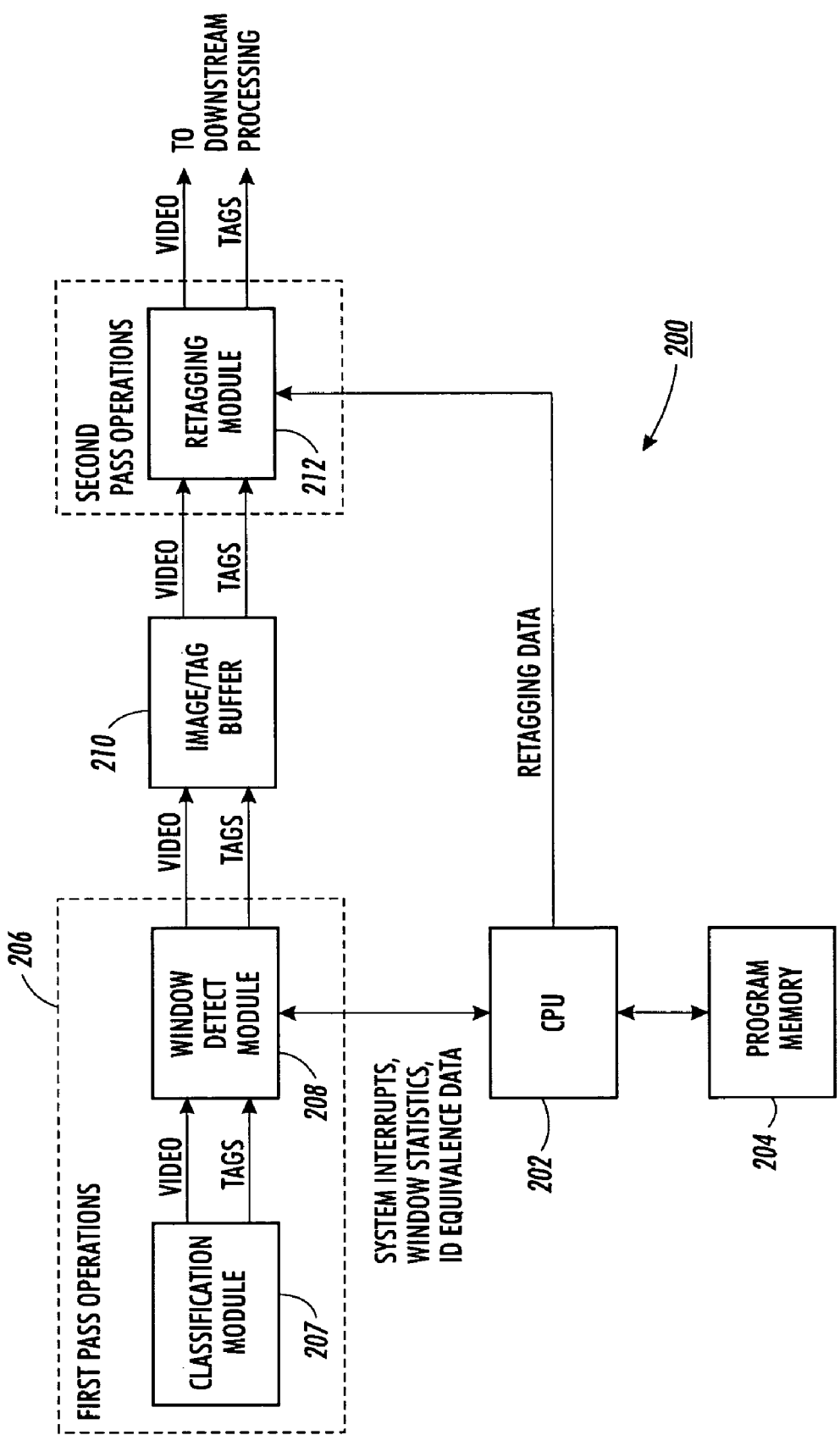
FIG. 2 shows a block diagram of an exemplary two pass windowing apparatus.

A block diagram of an exemplary two pass windowing system 200 that may carry out the exemplary method is shown in FIG. 2. The exemplary system 200 may include a central processing unit (CPU) 202 in communication with a program memory 204, a first pass operations module 206 including a classification module 207 and a window detection module 208, a RAM image buffer 210 and a retagging module 212. The CPU 202 may transmit and/or receive system interrupts, statistics, ID equivalence data and other data to/from the window detection module 208 and may transmit pixel retagging data to the retagging module 212. The first pass and second pass operations may be implemented in a variety of different hardware and software configurations, and the exemplary arrangement shown is non-limiting.

During the first pass through the image data, pixels may be classified by the classification module 207 into, for example, white, black, edge, edge in halftone, continuous tone, and halftones over a range of frequencies. Segmentation tags, edge strength tags and video may be sent to the window detection module 208, which may use such tags and video to associate pixels with various windows and calculate various statistics for each window created.

Although default control parameters for background white threshold and background gain may be used initially, once sufficient statistics are collected, subsequent values may be determined and downloaded by the CPU 202, in step S102, to the window detection module 208. Using such subsequent values may improve the determination of whether a pixel is part of a window or is background. A detailed description of such control parameters is provided below.

As the image is scanned and stored, each pixel may, in step S104, be classified and tagged by the classification module 207 as being of a specific image type. In the exemplary embodiment shown in FIG. 1, the tags may also be stored. Alternatively, however, the tags may not be stored for later use, instead, they may be recreated at the beginning of the second pass. In addition, step S104 may be performed concurrently with step S102. The order of the steps shown in FIG. 1 is exemplary only and is non-limiting.

An exemplary approach to pixel classification may include comparing the intensity of a pixel to the intensity of its surrounding neighboring pixels. A judgment may then be made as to whether the intensity of the pixel under examination is significantly different than the intensity of the surrounding pixels. When a pixel has a significantly high luminance, the pixel may be classified as a background pixel. However, as discussed below, pixels adjacent to window objects may be uncertain in this regard.

Subsequent to pixel classification, the window detection module 208 may, in step S106, analyze each pixel and may determine whether the pixel is window or background. Exemplary methods described herein may better define an outline around window objects by using at least one control parameter specific to determining whether pixels belong to window or background areas. Such control parameters may include a background gain parameter and/or a background white threshold parameter that may be predetermined or calculated and may be distinct from other gain and/or white threshold levels used by the classification step S104 to classify a "white" pixel with a white tag.

In step S108, a window mask may be generated as the document is scanned and stored into image/tag buffer 210. The scanned image data may comprise multiple scanlines of pixel image data, each scanline typically including intensity information for each pixel within the scanline, and, if color, chroma information. Typical image types include graphics, text, white, black, edge, edge in halftone, continuous tone (rough or smooth), and halftones over a range of frequencies.

During step, S110, window and line segment IDs may be allocated as new widow segments are encountered. For example, both video and pixel tags may be used to identify those pixels within each scanline that are background and those pixels that belong to image-runs. The image type of each image run may then be determined based on the image type of the individual pixels. Such labels, or IDs, may be monotonically allocated as the image is processed.

In step S112, the window detection module 208 may dynamically compile window ID equivalence information and store such data in an ID equivalent table, for example.

Also in step S112, decisions are made to discard windows and their associated statistics which have been completed without meeting minimum window requirements.

In step S114, at the end of the first pass, an ID equivalence table and the collected statistics may be analyzed and processed by the window detection module 208. When processing is completed, the window detection module 208 may interrupt the CPU 202 to indicate that all the data is ready to be retrieved.

Typically, while a document image is initially scanned, the windowing apparatus performs its first pass through the document image. In order to optimize processing speed, a subsequent image may be scanned and undergo first pass windowing operations concurrent with the second pass of the first image. However, after the first pass operations finish, but before the second pass begins, inter-document handling may be performed by the CPU 202.

In step S116, the CPU may read the statistics of all windows that have been kept and apply heuristic rules to classify the windows. Windows may be classified as one of various video types, or combinations of video types.

In addition, between the first and second pass operations, the CPU 202 may generate and store, in step S118, a window segment ID-to-Tag equivalence table.

During a second pass, pixels may be tagged by the retagging module 212. In step S120, the CPU 202 may download retagging data comprising the window segment ID-to-Tag equivalence table to the retagging module 212. In step S122, the retagging module 212 may read the window mask from the image buffer 210 and may retag pixels within all selected windows with an appropriate uniform tag based upon the ID-to-Tag equivalence table.

Once each portion of the image data has been classified according to image types, further processing of the image data may be performed more optimally.

Referring back to step S106, during the first pass through the image data, document content may detrimentally interact with the video levels of adjacent background pixels. This interaction may be through optical and electrical mechanisms such as Modulation Transfer Function (MTF), Integrated Cavity Effect (ICE), and analog video path bandwidth, and may result in background areas decreasing from their proper white level as the true transition from background white to the document object is approached. This may result in the area being detected as the window "growing," and, if the objects are close together, may result in objects that should be separate being erroneously joined.

If the window detection module 208 does not properly distinguish between window pixels and background pixels in a way that delineates the windows accurately, then two very different windows may accidentally be classified as a single window. The combined statistics of the dissimilar windows would likely lead to inappropriate classification, resulting in downstream processing being applied which not only is non-optimal, but also inappropriate for one or both of the erroneously joined windows. Known techniques, including a de-ICE module, not shown, have been used to compensate for one contributor, but a residue, as well as the effect of other contributors, remains.

As previously noted, exemplary embodiments of methods which correctly classify pixels between windows and background may enable downstream modules to more optimally render each window. Typically, during first pass scanning, the window detection module 208 multiplies the input video by the gain. If the result is greater than or equal to a white threshold, then the tag corresponding to that pixel may be set to indicate background.

For example, methods may be implemented in the window detection module 208 and may use a combination of predetermined and calculated background video gain and background white threshold parameters to boost video levels that are close to the background level and use such boosted video levels to distinguish between background and window.

Exemplary methods may render a best-estimate outline delineating document windows by using a window detect white threshold determined by using heuristics and calculations different than those used by the pixel classification white threshold in the classification module 207. The pixel classification white threshold is used to classify a pixel as being "white," for the purpose of optimally controlling pixel oriented video processing, and may not be best suited for delineating document windows. An independently arrived at window detect white threshold may be more suitable for the different task of differentiating between document background and document content.

Such exemplary methods may use fixed, document statistics and/or system dependent parameters, either static during an entire page or dynamically adjusted during page processing, to automatically adjust the background white threshold parameter.

At the start of document scanning, a "Default Background Gain" value and a "Default White Threshold" value may be downloaded to the window detection module 208, to initially identify tags as background or window until more accurate values may be determined.

As scanlines are processed, statistics may be generated, and based upon an analysis of such statistics, an estimated background pixel level may be determined. Applying the estimated background pixel level, a determined "Background Gain" value and a determined "Background White Threshold" value may be calculated by the CPU 202 at step S108. These values may be downloaded, in step S108, to the window detection module 208 and, under direction of the CPU 202, may be used to improve delineation of window outlines.

An exemplary method of tag identification may comprise setting the Background Gain according to the estimated background pixel level and setting the Background White Threshold to a certain value. Because the window detection module 208 may need to boost the video, the Background Gain may be programmed with some value greater than 1.0. For example, if the Background Gain is set to 1.3, the Background White Threshold may be set, for example, to 245. Based upon these values, a tag corresponding to a pixel value of 230, which may otherwise be classified as window, may be now classified as background ([230*1.3]>245).

Another exemplary method of tag identification may comprise setting the Background Gain at 1.0 and setting the Background White Threshold somewhat lower than a white pixel classification threshold used to step S104 to accurately classify pixels as to video type. Using such a method, a Background Gain of 1.0 and a Background White Threshold of 225 may result in a tag corresponding to a pixel value of 230 being classified as background ([230*1]>225).

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art and are also intended to be encompassed by the following claims.

What is claimed is:

1. A windowing method, comprising:

adjusting a specified pixel of image data by a default background gain to obtain an adjusted pixel value, the image data comprising a plurality of pixels;

setting a pixel tag corresponding to the specified pixel as background if the adjusted pixel value is greater than a default white threshold;

collecting statistics on the plurality of pixels;

analyzing the collected statistics to determine an estimated background pixel level;

calculating a determined background gain and a determined white threshold based on the estimated background pixel level;

readjusting the specified pixel of image data by the determined background gain to obtain a readjusted pixel value; and re-setting the pixel tag corresponding to the specified pixel as background if the readjusted pixel value is greater than the determined white threshold, wherein the method is performed by a processor.

2. The windowing method according to claim 1, wherein the collected statistics are dynamically adjusted during processing of a page of image data.

3. The windowing method according to claim 1, wherein the determined background gain is set to 1.0.

4. The windowing method according to claim 3, wherein the determined white threshold is lower than the default white threshold.

5. The windowing method according to claim 1, wherein the collected statistics are based upon at least one of fixed, document statistics or system dependent parameters.

6. A windowing apparatus, comprising:

at least one logic module, the at least one logic module being configured:

to adjust a specified pixel of image data by a default background gain to obtain an adjusted pixel value, the image data comprising a plurality of pixels;

to set a pixel tag corresponding to the specified pixel as background if the adjusted pixel value is greater than a default white threshold;

to collect statistics on the plurality of pixels;

to analyze the collected statistics to determine an estimated background pixel level;

to calculate a determined background gain and a determined white threshold based on the estimated background pixel level;

to readjust the input video of the specified pixel of image data by the determined background gain to obtain a readjusted pixel value, and to re-set the pixel tag corresponding to the specified pixel as background if the readjusted pixel value is greater than the determined white threshold.

7. The apparatus according to claim 6, wherein the at least one logic module is further configured to dynamically adjust collected statistics during processing a page of image data.

8. The apparatus according to claim 6, wherein the at least one logic module is further configured to collect statistics based upon at least one of fixed, document statistics or system dependent parameters.

9. The apparatus according to claim 6, wherein the determined background gain is set to 1.0.

10. The apparatus according to claim 9, wherein the determined white threshold is lower than the default white threshold.

11. A xerographic imaging device comprising the apparatus of claim 6.

12. A method of delineating an outline of a window region within image data, comprising:

a first pass through the image data, the first pass including:

adjusting a specified pixel of image data by a default background gain to obtain an adjusted pixel value, the image data comprising a plurality of pixels, setting a pixel tag corresponding to the specified pixel as background if the adjusted pixel value is greater than a default white threshold, collecting statistics on the plurality of pixels, and analyzing the collected statistics to determine an estimated background pixel level, and calculating a determined background gain and a determined white threshold based on the estimated background pixel level; and a second pass through the image data, the second pass including:

readjusting the specified pixel of image data by the determined background gain to obtain a readjusted pixel value, and re-setting the pixel tag corresponding to the specified pixel as background if the readjusted pixel value is greater than the determined white threshold, wherein the method is performed by a processor.

13. The method according to claim 12, wherein the collected statistics are dynamically adjusted during processing a page of image data.

14. The method according to claim 12, wherein the determined background gain is set to 1.0.

15. The method according to claim 14, wherein the determined white threshold is lower than the default white threshold.

* * * * *